United States Patent
Glime, III

(10) Patent No.: US 11,927,273 B2
(45) Date of Patent: Mar. 12, 2024

(54) ARRANGEMENTS AND METHODS FOR CONTROLLED VALVE FLOW RATE

(71) Applicant: SWAGELOK COMPANY, Solon, OH (US)

(72) Inventor: William H. Glime, III, Chagrin Falls, OH (US)

(73) Assignee: SWAGELOK COMPANY, Solon, OH (US)

( * ) Notice: Subject to any disclaimer, the term of this patent is extended or adjusted under 35 U.S.C. 154(b) by 0 days.

(21) Appl. No.: 17/774,504

(22) PCT Filed: Nov. 17, 2020

(86) PCT No.: PCT/US2020/060824
§ 371 (c)(1),
(2) Date: May 5, 2022

(87) PCT Pub. No.: WO2021/101855
PCT Pub. Date: May 27, 2021

(65) Prior Publication Data
US 2022/0390030 A1    Dec. 8, 2022

Related U.S. Application Data

(60) Provisional application No. 62/936,769, filed on Nov. 18, 2019.

(51) Int. Cl.
*F16K 27/02* (2006.01)
*F16K 31/122* (2006.01)

(52) U.S. Cl.
CPC .......... *F16K 27/02* (2013.01); *F16K 31/1221* (2013.01); *F16K 31/1226* (2013.01)

(58) Field of Classification Search
CPC ... F16K 31/1221; F16K 31/1226; F16K 27/07
See application file for complete search history.

(56) References Cited

U.S. PATENT DOCUMENTS

| | | |
|---|---|---|
| 5,791,369 A | 8/1998 | Nishino et al. |
| 5,816,285 A | 10/1998 | Ohmi et al. |
| (Continued) | | |

FOREIGN PATENT DOCUMENTS

| | | |
|---|---|---|
| WO | 2014182756 | 11/2014 |
| WO | 2021101855 | 5/2021 |

OTHER PUBLICATIONS

International Search Report and Written Opinion from PCT/US2020/060824 dated Feb. 18, 2021.

*Primary Examiner* — Daphne M Barry
(74) *Attorney, Agent, or Firm* — Calfee, Halter & Griswold LLP

(57) ABSTRACT

An actuated valve assembly includes a valve body (110) having a valve seat (112) disposed between inlet (111) and outlet (113) passages, and a fixed orifice (115) restriction provided in at least one of the inlet and outlet passages, a valve element (120) assembled with the valve body and axially movable between a closed position and an open position, and an actuator (130) assembled with the valve body and connected with the valve element for axial movement of the valve element between the closed and open positions. A ratio of the maximum seat annulus flow coefficient associated with the valve seat and valve element to an orifice flow coefficient associated with the fixed orifice restriction is between about 2:1 and about 8:1.

20 Claims, 7 Drawing Sheets

(56) References Cited

U.S. PATENT DOCUMENTS

| | | |
|---|---|---|
| 6,871,803 B1 | 3/2005 | Ohmi et al. |
| 7,337,805 B2 | 3/2008 | Brown et al. |
| 2006/0191777 A1* | 8/2006 | Glime ................. F16K 31/1225 |
| | | 200/81 R |
| 2017/0343115 A1 | 11/2017 | Glime, III et al. |
| 2019/0257440 A1 | 8/2019 | Glime, III et al. |
| 2020/0248831 A1* | 8/2020 | Keeper .................. F16K 31/42 |
| 2021/0108738 A1* | 4/2021 | Glime, III ........... F15B 15/1409 |
| 2022/0136610 A1* | 5/2022 | Glime, III ........... F16K 27/0236 |
| | | 251/335.2 |

* cited by examiner

ARRANGEMENTS AND METHODS FOR CONTROLLED VALVE FLOW RATE

CROSS-REFERENCE TO RELATED APPLICATION

This application claims priority to and all benefits of International Application No. PCT/US2020/060824, filed on Nov. 17, 2020, which claims priority to and all benefits of U.S. Provisional Patent Application Ser. No. 62/936,769, filed on Nov. 18, 2019, entitled ARRANGEMENTS AND METHODS FOR CONTROLLED VALVE FLOW RATE, the entire disclosures of which are incorporated herein by reference.

BACKGROUND

Actuated valves are often used to control the application of fluid from a fluid source to a component. In some applications, a precise, consistent flow rate is needed to ensure that the properties of a treated component are acceptable. As one example, actuated valves having a desired flow capacity or flow coefficient Cv in an open position are used to supply controlled volumes of fluid for deposition on semiconductor wafers, for which film thickness and etch depth are critical parameters. The flow coefficient Cv of such a valve can be calculated, for example, using measured values for fluid system parameters (e.g., flow, pressure drop, temperature, etc.) based on flow tests and equations, for example, as described in ISA S75.02 and other conventional standards for measuring and computing Cv, or by employing computational fluid dynamics (CFD) to model flow and estimate Cv.

The flow rate through a conventional actuated valve, even if actuatable to a desired flow setting (e.g., in a fully open or partially open valve condition), may be subject to small variations resulting from, for example, changes to the fluid pressure and/or temperature, deformation of the valve seat and/or valve sealing member, or resistance to actuation within the valve and/or valve actuator. These deviations in the flow rate can result in systems and/or produced components that do not meet required specifications, resulting in system downtime (for valve repair and/or adjustment) and/or lost productivity. In production environments where multiple systems operating in parallel are expected to have identical output, it is also beneficial to have valves with identical flow output to their counterparts on other systems.

SUMMARY

In an exemplary embodiment of the present disclosure, an actuated valve assembly includes a valve body having a valve seat disposed between inlet and outlet passages, and a fixed orifice restriction provided in at least one of the inlet and outlet passages, a valve element assembled with the valve body and axially movable between a closed position and an open position, and an actuator assembled with the valve body and connected with the valve element for axial movement of the valve element between the closed and open positions. The actuator including a stroke adjustment mechanism operable to adjust the open position to limit the movement of the valve element to adjust a seat annulus flow coefficient associated with the valve seat and valve element from a maximum seat annulus flow coefficient when the valve element is in the open position. A ratio of the maximum seat annulus flow coefficient to an orifice flow coefficient associated with the fixed orifice restriction is between about 2:1 and about 8:1, or between about 3:1 and about 5:1.

In another exemplary embodiment of the present disclosure, an actuated valve assembly includes a valve body including a valve seat disposed between inlet and outlet passages, and a fixed orifice restriction provided in at least one of the inlet and outlet passages, a valve element assembled with the valve body and axially movable between a closed position and an open position, and an actuator assembled with the valve body and connected with the valve element for axial movement of the valve element between the closed and open positions. The actuator includes a stroke adjustment mechanism operable to adjust the open position to limit the movement of the valve element to adjust a seat annulus flow area associated with the valve seat and valve element from a maximum seat annulus flow area when the valve element is in the open position. A ratio of the maximum seat annulus flow area to a flow area of the fixed orifice restriction is between about 2:1 and about 8:1, or between about 3:1 and about 5:1.

In another exemplary embodiment of the present disclosure, an actuated valve assembly includes a valve body having a valve seat disposed between inlet and outlet passages, and a fixed orifice restriction provided in one of the inlet and outlet passages and having a first flow area, the other of the inlet and outlet passages having a second flow area, a valve element assembled with the valve body and axially movable between a closed position and an open position, and an actuator assembled with the valve body and connected with the valve element for axial movement of the valve element between the closed and open positions. A ratio of the second flow area to the first flow area is between about 3:2 and about 5:1, or between about 2:1 and about 4:1.

In another exemplary embodiment of the present disclosure, an actuated valve assembly includes a valve body including a valve seat disposed between inlet and outlet passages, and a fixed orifice restriction provided in at least one of the inlet and outlet passages, a valve element assembled with the valve body and axially movable between a closed position and an open position, and an actuator assembled with the valve body and connected with the valve element for axial movement of the valve element between the closed and open positions. The actuated valve assembly, if provided without the fixed orifice restriction, such that both the inlet and outlet passages have the second flow area, has a first maximum flow coefficient, and the actuated valve assembly with the fixed orifice restriction has a second maximum flow coefficient, wherein the ratio of the first maximum flow coefficient to the second maximum flow coefficient is between about 2:1 and about 5:1, or between about 3:1 and about 4:1.

DETAILED DESCRIPTION OF EXEMPLARY EMBODIMENTS

Figure 1:
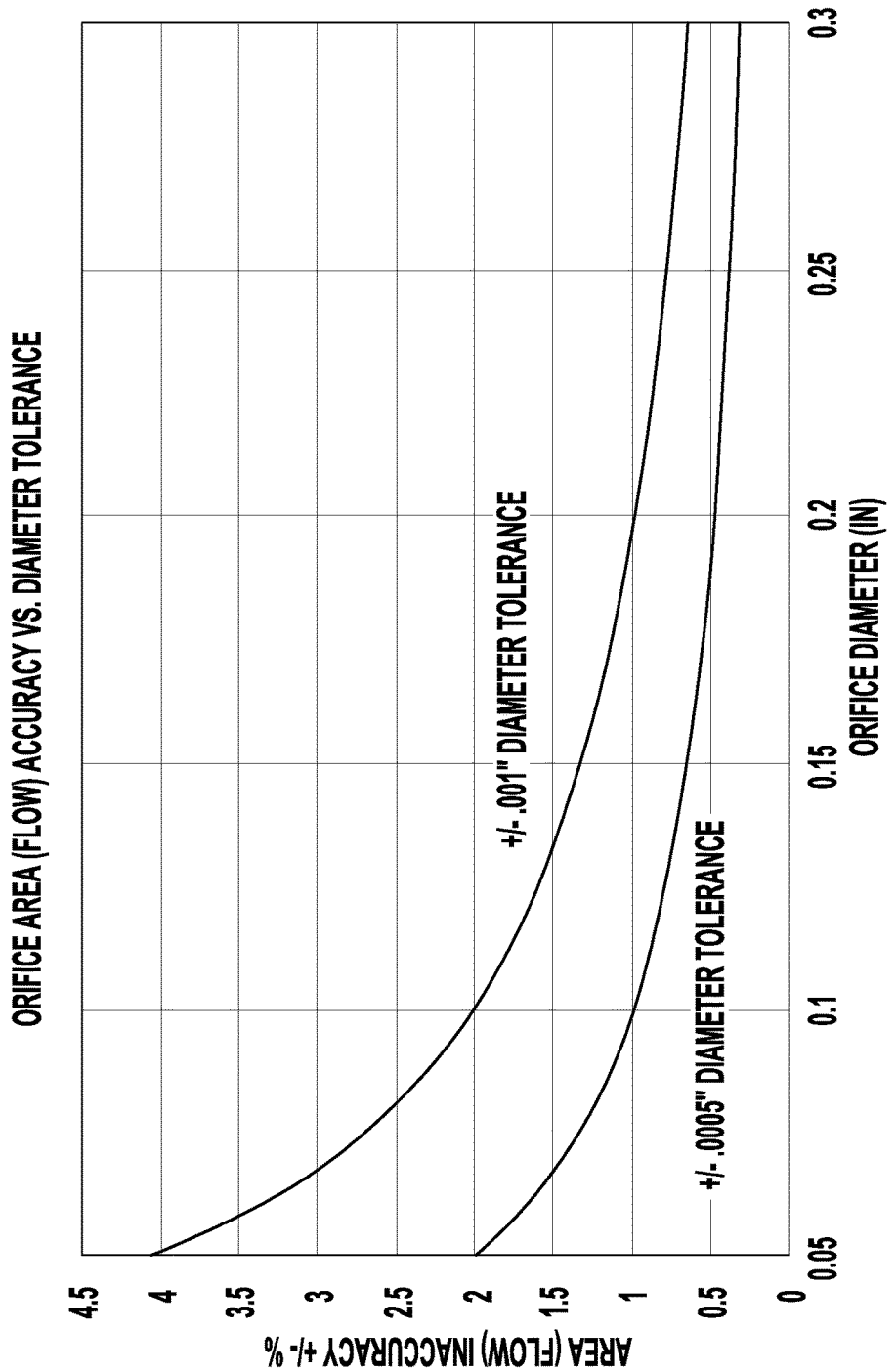
FIG. 1 illustrates a graph showing the effective flow variability of an orifice having a 0.0005 inch or 0.001 inch diameter tolerance, as a function of the orifice diameter.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include the specified value, values within 5% of the specified value, and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

The present disclosure contemplates arrangements and methods for controlling the flow rate through an actuated shutoff valve, for example, to establish consistency and uniformity of flow through the valve, and to minimize deviations in flow over time, while allowing for flow rate adjustability through limited actuation of the valve element.

Valves within a system are often inherently subject to flow deviations of three types. Dimension-based flow deviations may result from valve component geometric/dimensional tolerances. This can result in flow coefficient deviations of +/−10% or more between valves "out of the box," or before the valves are placed into service. Cycle-based flow deviations (or "valve drift") may result from wear or deformation of the valve seat and/or sealing element, resistance to actuation in the valve or actuator, or other such conditions. System-based flow deviations (or "valve shift") may result from changing system conditions, including, for example, changes in temperature (e.g., resulting in thermal expansion of the valve seat) or pressure (e.g., resulting in changes in diaphragm/bellows height). In some applications, even small flow deviations may be significant, such as, for example, in systems where multiple valves used in parallel are required to provide precise, consistent (or "matching") flow through each valve, as is the case in many semiconductor wafer processing applications. Because valves within a system cannot be relied on to experience valve drift and/or valve shift at equal rates, valves in a system that initially provide suitably consistent flow may deviate from each other by a greater and unacceptable degree over time.

A conventional valve may be adjusted to compensate for flow deviations, for example, by manually or automatically adjusting the open position of the valve element (e.g., by changing the amount of valve element stroke from the closed position), to adjust the flow area between the valve element (e.g., stem tip, diaphragm) and the valve seat in the valve's open position (the "seat annulus flow area") from a maximum seat annulus flow area, and the corresponding flow capacity or flow coefficient of the valve from a maximum flow capacity or flow coefficient. Such adjustments may effectively correct for "out of the box" flow deviations between valves (either by the valve manufacturer or upon initial installation). However, these adjustments are generally reactive when correcting for valve drift or valve shift of valves while in use, and are not implemented until the valve flow has fallen outside of an allowable range or tolerance. This can result in fluid-treated products that must be scrapped or reworked, and/or system downtime to make the necessary valve adjustments. In some applications the adjustment of valves to correct for drift requires equipment to be shut down—such disruptions can be costly and time consuming.

According to an exemplary aspect of the present disclosure, a valve having a greater than required flow capacity and greater than desirable flow tolerance (e.g., due to the factors described above) may be adapted to have a flow passage (e.g., upstream and/or downstream from the valve seat) with a precision-formed (e.g., reamed) fixed orifice restriction that is large enough to limit reduction of the flow capacity to the required flow capacity, while small enough to reduce the flow deviations to an acceptable flow tolerance. Because the fixed orifice restriction does not include components that are significantly affected by valve cycling or changes in system conditions, deviations in flow attributable to the fixed orifice restriction are substantially limited to dimensional tolerances of the orifice, and are not significantly affected by valve drift or by valve shift (beyond minimal thermal expansion of the orifice-defining material).

Fixed orifice restrictions, whether integrally formed or provided in an inserted component, may be formed to have a high precision (e.g., within about +/−0.001 inch or within about +/−0.0005 inch tolerance on an orifice diameter) sufficient to minimize flow coefficient (Cv) tolerance attributable to the orifice restriction (as compared to conventional valve orifice tolerances of within about +/−0.005 inch on an orifice diameter). In an exemplary embodiment, the Cv tolerance associated with a precision-formed orifice restriction may be limited to +/−1% using known manufacturing techniques. FIG. 1 illustrates a graph showing the effective flow variability of an orifice having a 0.0005 inch or 0.001 inch diameter tolerance, as a function of the orifice diameter.

In a valve assembly with a fixed orifice restriction, a smaller orifice flow coefficient $Cv_2$ (or larger valve to orifice flow coefficient ratio, $Cv_1/Cv_2$) results in a greater impact on the effective flow coefficient Cv and a reduced impact of the non-restricted valve flow coefficient $Cv_1$, including its tolerance/variability, on the effective flow coefficient. The effective flow coefficient Cv of a valve having a non-restricted flow coefficient $Cv_1$, when provided with a fixed orifice restriction having a reduced orifice flow coefficient $Cv_2$ can be expressed as:

$$C_v = \sqrt{\frac{1}{\left(\frac{1}{C_{v_1}}\right)^2 + \left(\frac{1}{C_{v_2}}\right)^2}}$$

Figure 2:
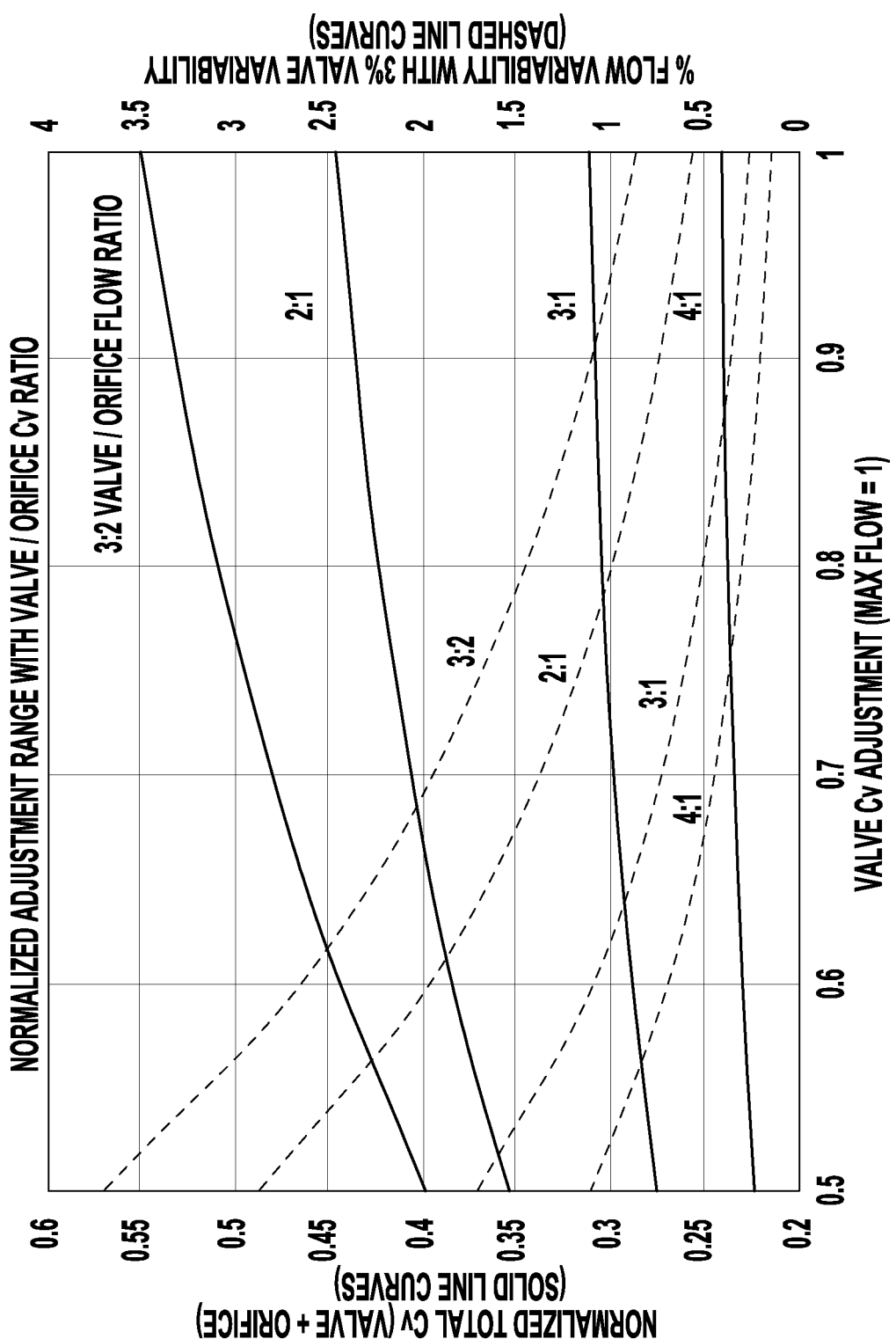
FIG. 2 illustrates a graph showing flow performance characteristics for a range of valve to orifice flow coefficient (Cv) ratios.

As one example, a valve having a valve to orifice Cv ratio of 2:1 (e.g., a non-restricted flow coefficient $Cv_1$ of 1.0 and an orifice flow coefficient $Cv_2$ of 0.5) produces an effective flow coefficient Cv of about 45% of the valve flow coefficient $Cv_1$. A valve having a valve to orifice Cv ratio of 3:1 produces an effective flow coefficient Cv of about 32% of the valve flow coefficient $Cv_1$. A valve having a valve to orifice Cv ratio of 4:1 produces an effective flow coefficient Cv of about 24% of the valve flow coefficient $Cv_1$. FIG. 2 illustrates a graph showing flow performance characteristics for a range of valve to orifice Cv ratios.

With a valve Cv tolerance of +/−3% and an orifice Cv tolerance of +/−1%, a valve having a valve to orifice Cv ratio of 2:1 (e.g., a non-restricted flow coefficient $Cv_1$ of 0.97 to 1.03 and an orifice flow coefficient $Cv_2$ of 0.495 to 0.505) produces an effective Cv tolerance of about +/−1.4%. Likewise, a valve to orifice Cv ratio of 3:1 produces an effective Cv tolerance of about +/−1.2%, and a valve to orifice Cv ratio of 4:1 produces an effective Cv tolerance of about +/−1.1%.

While the effective Cv tolerance of the valve is reduced by a precision-formed fixed orifice restriction having a lower (e.g., +/−1%) Cv tolerance, as illustrated above, it may be desirable to further reduce any flow deviation resulting from the combined Cv tolerances of the unrestricted valve and the fixed orifice restriction. According to another aspect of the present disclosure, to further reduce or eliminate the effective Cv tolerance of the valve "out of the box," the actuation stroke of the valve may be adjusted to increase or decrease the effective flow coefficient Cv to within a desired range to correspond to a desired "out of the box" flow coefficient Cv. Many different flow setting mechanisms may be utilized to provide for flow adjustment, examples of which are described in U.S. Pat. No. 7,337,805 (the "'805 Patent"), US Patent App. Pub. No. 2019/0,257,440 (the "'440 Application"), and U.S. application Ser. No. 17/065,784, filed on Oct. 8, 2020 (the "'784 Application"), the entire disclosures of each of which are incorporated herein by reference.

Figure 3:
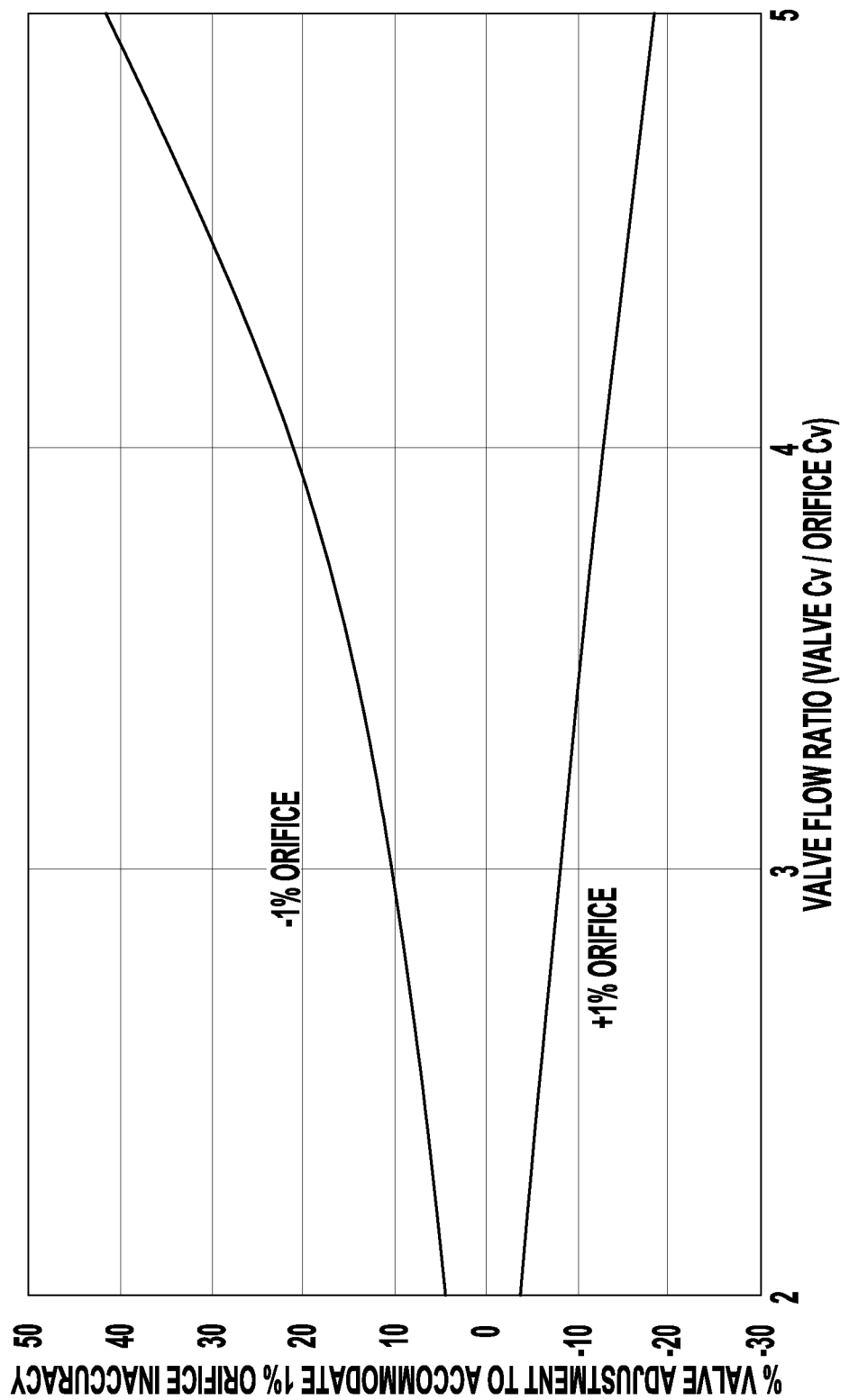
FIG. 3 illustrates a graph showing the required valve Cv adjustment to eliminate a 1% orifice Cv variability as a function of the valve to orifice Cv ratio.

In an adjustable stroke actuated valve including a fixed orifice restriction, the adjustment of the valve stroke required to adjust the Cv (e.g., to eliminate or minimize any deviation in Cv from a desirable value) is proportional to the maximum valve to orifice Cv ratio (i.e., without reduction of the valve Cv using the stroke adjustment mechanism). For a larger valve to orifice Cv ratio (i.e., a smaller fixed orifice restriction), a larger adjustment of the valve stroke is required to adjust the effective Cv of the valve. FIG. 3 illustrates a graph showing the required valve Cv adjustment to eliminate a 1% orifice Cv variability as a function of the valve to orifice Cv ratio.

Figure 4:
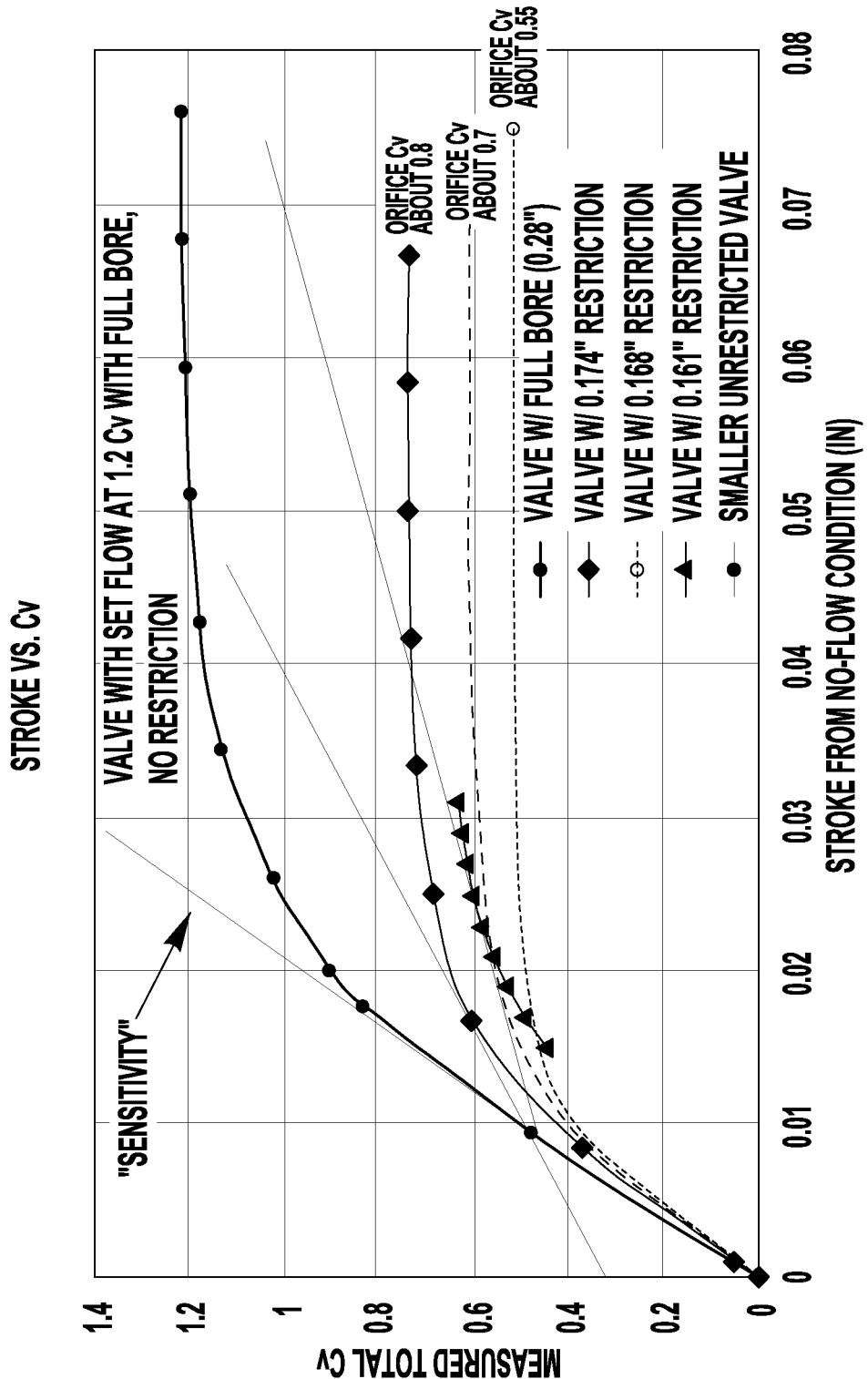
FIG. 4 illustrates a graph showing flow coefficient as a function of stroke from the closed (no flow) condition.

As the valve stroke—Cv curve for many valves (e.g., diaphragm valves) is relatively steep at the lower end of the flow range (e.g., between the closed condition and the ½ maximum flow condition), adjustments into the lower flow range may be undesirable, as such a valve condition produces a greater degree of flow variability and reduced flow stability. By limiting valve stroke adjustments to the upper end of the flow range (e.g., between the ½ maximum flow condition and the maximum flow condition), flow consistency and stability may be maximized. FIG. 4 illustrates a graph showing flow coefficient as a function of stroke from the closed (no flow) condition.

As such, in some applications, it may be desirable to limit the maximum valve to orifice Cv ratio to a range that provides both sufficient minimization of valve drift and valve shift during use and sufficient adjustability of the effective Cv to allow for minimization of any Cv deviations resulting from "out of the box" Cv tolerances. In one embodiment, a valve is provided with a maximum valve to orifice Cv ratio between 3:2 and 5:1, or between 2:1 and 5:1, or between 5:2 and 4:1, or between 3:1 and 4:1. For example, a valve having a maximum valve to orifice Cv ratio of 2:1 may provide for actuator stroke adjustment of the effective Cv, within the upper half of the valve Cv range, of +/−13% (or a 26% reduction from the maximum flow condition). A valve having a maximum valve to orifice Cv ratio of 3:1 may provide for actuator stroke adjustment of the effective Cv, within the upper half of the valve Cv range, of about +/−7% (or a 14% reduction from the maximum flow condition). A valve having a maximum valve to orifice Cv ratio of 4:1 may provide for actuator stroke adjustment of the effective Cv, within the upper half of the valve Cv range, of about +/−4% (or an 8% reduction from the maximum flow condition). The variability of this flow adjustment increases as the adjusted valve Cv decreases, as shown by the dashed line curves in the graph of FIG. 2.

Once an actuated valve has been adjusted to minimize or eliminate any out of the box Cv deviation in the valve, Cv deviations associated with valve drift and valve shift may be significantly reduced by the fixed orifice restriction, such that the requirement for adjustment of the valve flow setting (e.g., actuation stroke adjustment) during valve use to maintain an acceptably precise and consistent Cv may be minimized or eliminated. For example, with a maximum valve to orifice Cv ratio of 2:1, a Cv deviation due to valve drift/shift (for the corresponding unrestricted valve) is reduced by about 83%, sufficient to reduce a valve drift/shift of almost 6% to a deviation of less than 1%. With a maximum valve to orifice Cv ratio of 3:1, a Cv deviation due to valve drift/shift is reduced by about 91%, sufficient to reduce a valve drift/shift of 10% to a deviation of less than 1%. With a maximum valve to orifice Cv ratio of 4:1, a Cv deviation due to valve drift/shift is reduced by about 95%, sufficient to reduce a valve drift/shift of almost 20% to a deviation of less than 1%.

As described above, the fixed orifice restriction contemplated herein may be defined in terms of a maximum ratio of the flow capacity or flow coefficient Cv of an unrestricted valve to the flow capacity or flow coefficient Cv of the flow restriction. As used herein, an "unrestricted valve" is considered to be one having upstream (or inlet) and downstream (or outlet) passages having substantially equal cross-sectional areas or flow areas, without a fixed orifice restriction, the passages sized such that the flow capacity of the valve is predominantly limited or controlled by the seat annulus flow area, or the area between the valve seat and the valve element (e.g., stem tip, diaphragm) when the valve is in the open condition. A flow restricted valve, or a valve having a fixed orifice restriction as contemplated herein, is considered to be one having a fixed orifice restriction in either or both of the upstream and downstream passages, sized such that the flow capacity of the valve is predominantly limited or controlled by the fixed orifice restriction, while still allowing for flow capacity or flow coefficient adjustment sufficient to correct for flow deviations resulting from dimensional tolerances, valve shift, and/or valve drift.

Accordingly, a flow restriction may additionally or alternatively be defined in terms of a ratio of the flow capacity or flow coefficient Cv associated with the seat annulus to the flow capacity or flow coefficient Cv associated with the fixed orifice restriction. In one such embodiment, the ratio of the seat annulus flow capacity or flow coefficient Cv to the fixed orifice restriction flow capacity or flow coefficient Cv is between about 2:1 and about 8:1, or between about 3:1 and about 5:1.

As another example, a flow restriction may additionally or alternatively be defined in terms of a ratio of the flow area of the seat annulus to the flow area of the fixed orifice restriction. In one such embodiment, the ratio of the seat annulus flow area to the fixed orifice restriction flow area is between about 2:1 and about 8:1, or between about 3:1 and about 5:1.

As another example, a flow restriction may additionally or alternatively be defined in terms of a ratio of the flow area of the unrestricted valve passage to the flow area of the fixed orifice restriction. In an exemplary embodiment, the ratio of the flow area of the unrestricted valve passage to the flow area of the fixed orifice restriction may be between about 3:2 and about 5:1, or between about 2:1 and about 4:1. In some such embodiments, the ratio of the flow area of the unrestricted valve passage to the maximum seat annulus flow area may be between about 1:2 and about 5:1, or between about 2:3 and about 2:1.

Figure 5:
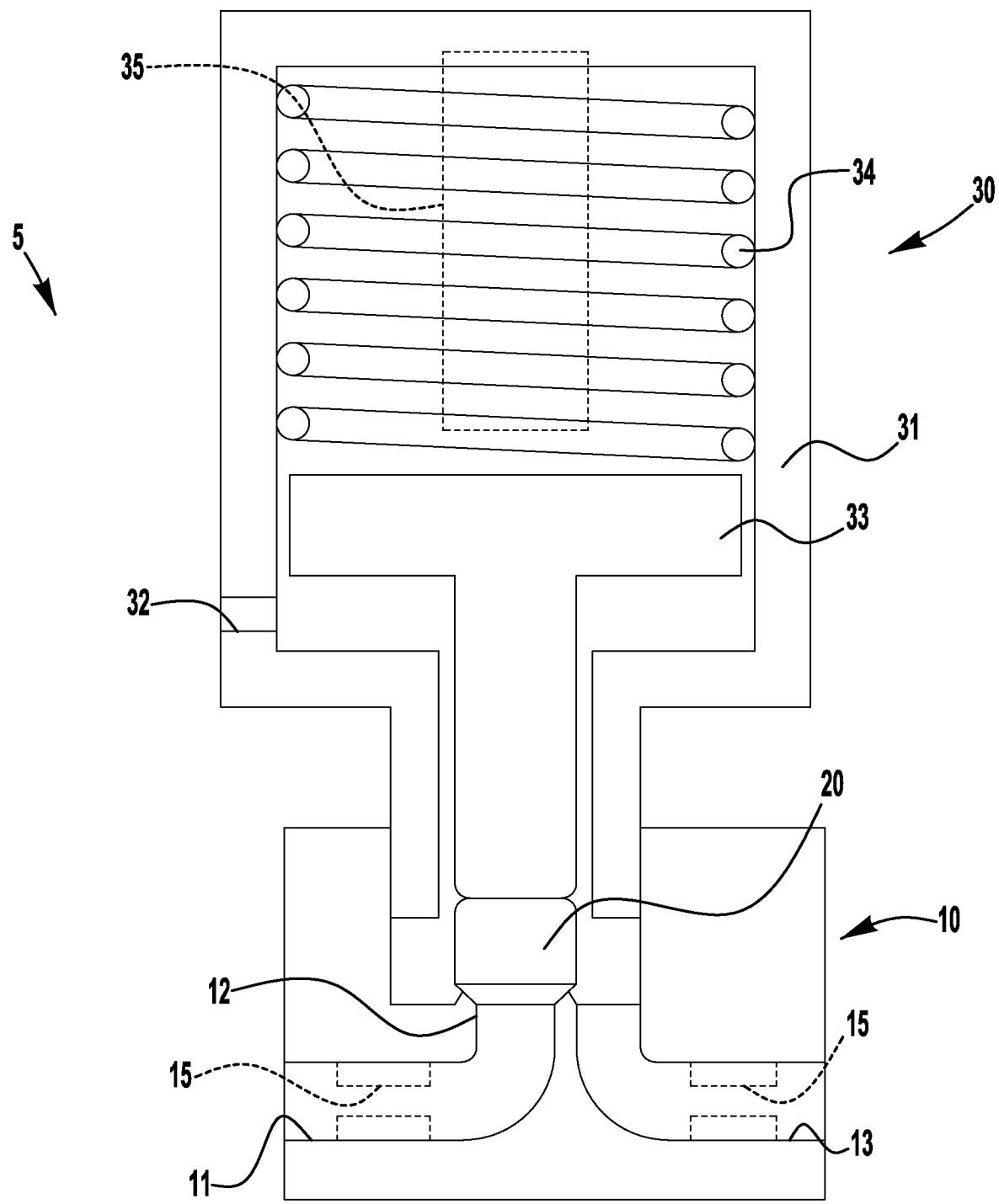
FIG. 5 schematically illustrates an exemplary actuated valve including a valve body with a fixed orifice restriction and an actuator including a stroke adjustment mechanism.

FIG. 5 illustrates an exemplary actuated valve assembly 5 including a valve body 10, a valve element 20, and an actuator 30. The valve body 10 includes a valve seat 12 disposed between inlet and outlet passages 11, 13. The valve element 20 is assembled with the valve body 10 and is movable between a closed position in sealing engagement with the valve seat 12, to block flow between the inlet and outlet passages 11, 13, and an open position spaced apart from the valve seat to permit flow between the inlet and outlet passages. Many different types of valve elements may be utilized, including, for example, an axially movable stem, poppet, or diaphragm having a sealing surface that seals against the valve seat 12.

The actuator 30 is assembled with the valve body 10 and is operatively connected with the valve element 20 for axial movement of the valve element between the closed and open positions. While many different types of actuators may be utilized, in the illustrated embodiment, the actuator 30 is a pneumatic actuator spring biased to the closed position ("normally closed") with an actuator port 32 receiving pressurized gas for pressurized movement of a piston 33 within an actuator housing 31 against a biasing spring 34, for movement of the valve element 20 to the open position.

The valve body 10 includes a fixed orifice restriction 15 selected to provide a reduced Cv restriction in series with the valve seat 12, as described above. The fixed orifice restriction 15 may be disposed upstream from the valve seat 12 (e.g., in the inlet passage 11), downstream from the valve seat (e.g., in the outlet passage 13), or both upstream and downstream from the valve seat (e.g., in both inlet and outlet passages). The fixed orifice restriction 15 may be integrally formed (e.g., machined) in the valve body 10, for example, continuous with or extending from the inlet passage 11 and/or outlet passage 13, or provided in a component (e.g., disc, plug, fitting) assembled with the valve body 10, for example, as a threaded connection, welded connection, gasket sealed insert, or other such assembly. The fixed orifice restriction 15 may provide a reduced flow area along the entirety of the flow passage(s), along a portion of the flow passage(s), or at a discrete location in the flow passage(s).

The actuator 30 may be provided with a stroke adjustment mechanism, shown schematically at 35, for factory and/or field adjustment of a valve stroke by the actuator between the closed and open positions, for example, to adjust the Cv of the open valve assembly to correct for out of the box valve-to-valve flow variability, as described above. Many different types of flow adjustment mechanisms may be utilized, including, for example, mechanisms described in the above incorporated '805 Patent, '440 Application, and '784 Application.

Figure 6:
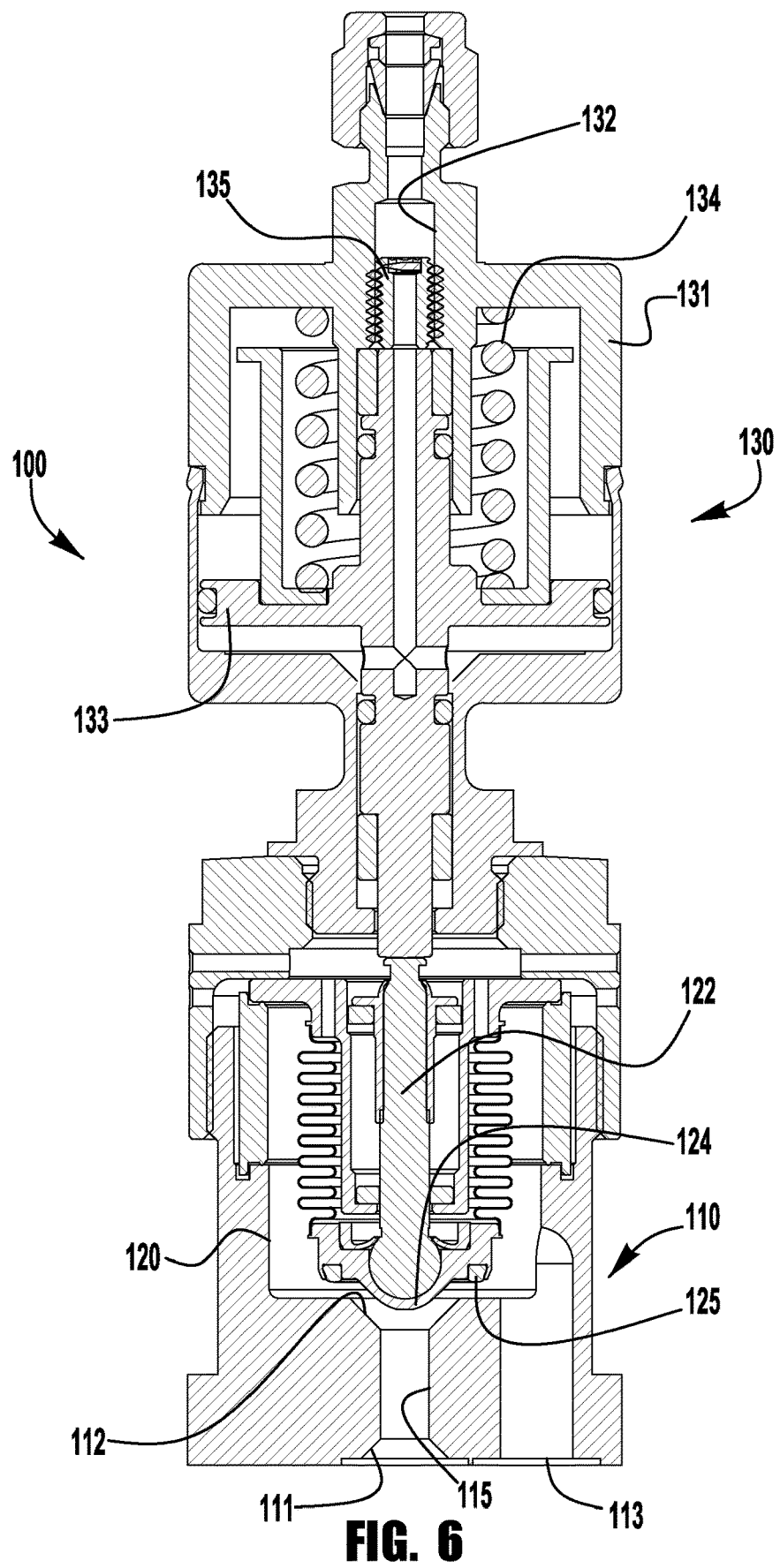
FIG. 6 illustrates an exemplary actuated valve including a valve body with a fixed orifice restriction and an actuator including a stroke adjustment mechanism.
Figure 7:
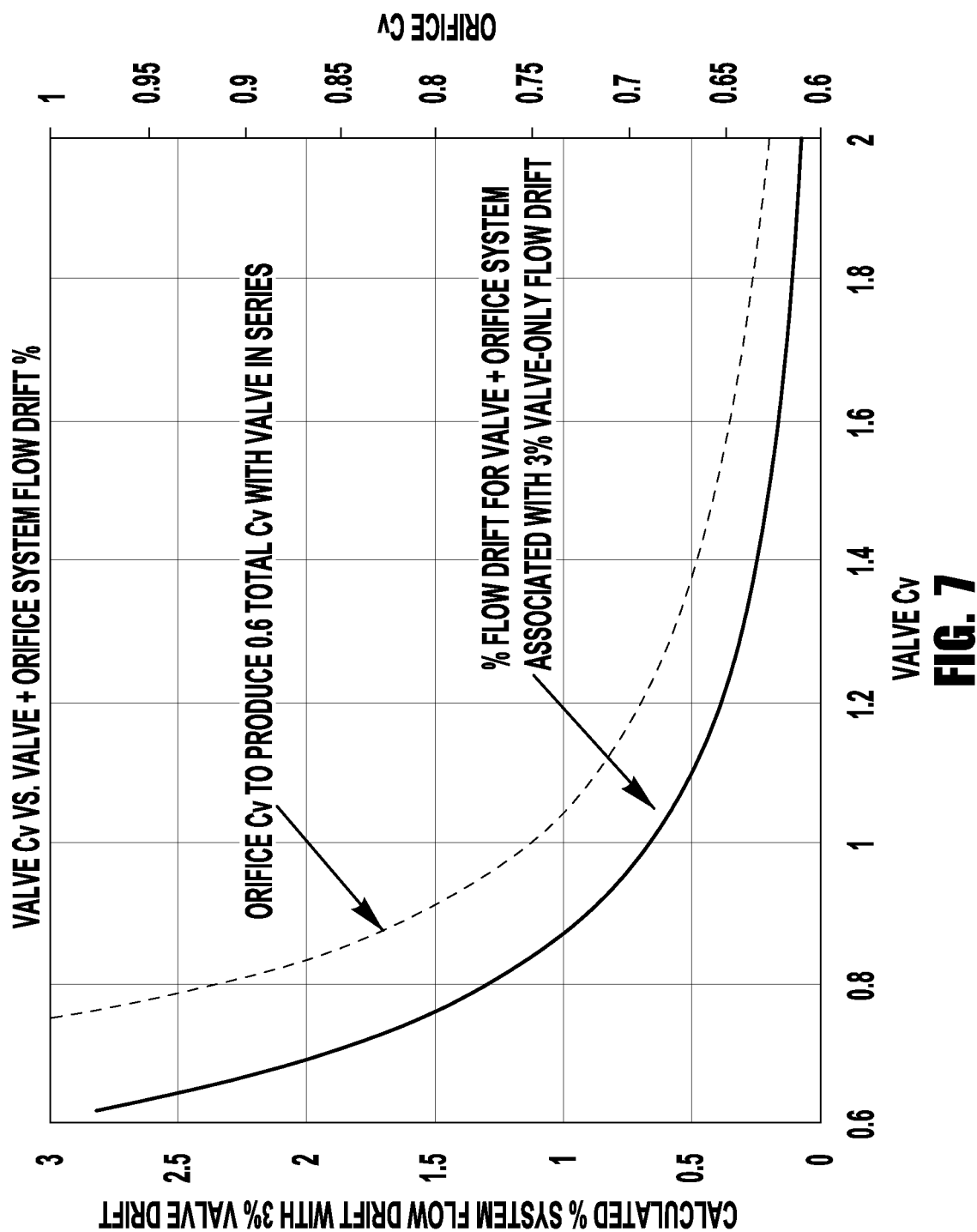
FIG. 7 illustrates a graph showing the effect of valve flow drift on a valve assembly including a fixed orifice restriction.

FIG. 6 illustrates an exemplary actuated valve assembly 100 including a valve body 110, a valve element 120, and an actuator 130. The valve body 110 includes a valve seat 112 disposed between inlet and outlet passages 111, 113. The valve element 120 is assembled with the valve body 110 and is movable between a closed position in sealing engagement with the valve seat 112, to block flow between the inlet and outlet passages 111, 113, and an open position spaced apart from the valve seat to permit flow between the inlet and outlet passages. While many different types of valve elements may be utilized, in the illustrated embodiment, the valve element 120 includes an axially movable stem 122 having a stem tip 124 assembled with an end portion of the stem, with the stem tip including an annular seal 125 (e.g., plastic seat) for sealing engagement with the valve seat 112 in the closed position.

The actuator 130 is assembled with the valve body 110 and is connected with the valve element 120 for axial movement of the valve element between the closed and open positions. While many different types of actuators may be utilized, in the illustrated embodiment, the actuator 130 is a pneumatic actuator spring biased to the closed position ("normally closed") with an actuator port 132 receiving pressurized gas for pressurized movement of a piston 133 within an actuator housing 131 against a biasing spring 134, for movement of the valve element 120 to the open position.

The valve body 110 includes a fixed orifice restriction 115 selected to provide a reduced Cv restriction in series with the valve seat 112, as described above. In the illustrated embodiment, the fixed orifice restriction 115 is upstream from the valve seat 112. In other embodiments, the fixed orifice restriction may be provided downstream from the valve seat. In the illustrated embodiment, the fixed orifice restriction 115 is integrally formed (e.g., machined) in the valve body 110, for example, continuous with or extending from the inlet passage 111. In other embodiments, a fixed orifice restriction may be provided in a component (e.g., disc, plug, fitting) assembled with the valve body, for example, as a threaded connection, welded connection, gasket sealed insert, or other such assembly.

The actuator 130 further includes a stroke adjustment mechanism 135 for factory and/or field adjustment of a valve stroke by the actuator between the closed and open positions, for example, to adjust the Cv of the open valve assembly to correct for out of the box valve-to-valve flow variability, as described above. While many different types of flow adjustment mechanisms may be utilized, in the illustrated embodiment, the stroke adjustment mechanism 135 includes an apertured set screw installed in the actuator port 132 and threadably adjustable to a range of axial positions to define a stop position for the piston 133 to limit the open position of the valve element 120.

In an exemplary embodiment, a valve 100 having inlet and outlet passages 111, 113, a valve seat 112 and a valve element 120 arrangement with a Cv of about 1.7 may be adapted to provide one of the flow passages 111, 113 with an orifice restriction 115 having a Cv of about 0.64 to provide a valve assembly having a Cv of about 0.60. For such a valve assembly having a valve seat/element flow variability of +/−3% and an orifice restriction variability of +/−1%, a reduced variability of +/−0.4% can be expected. FIG. 6 illustrates a graph showing the effect of valve flow drift on a valve assembly including a 1.7 Cv valve arrangement and a 0.64 Cv orifice restriction.

In one such arrangement, a non-restricted valve includes 0.38" diameter (0.113 in$^2$ cross-sectional area) inlet and outlet passages that together contribute a Cv of about 3, and a valve seat and stem tip having a 0.4" flow annulus diameter and a 0.07" fully open seat flow gap that provide a seat annulus flow area (i.e., annular area between valve seat and stem tip in fully open valve position) of about 0.088 in$^2$ and a Cv of about 2, to provide a valve having a Cv of about 1.7. In such an arrangement, providing the inlet passage with a 0.150" diameter (0.018 in$^2$ cross-sectional area) reduces orifice provides a 0.64 Cv flow restriction and an effective Cv of about 0.60 for the valve.

In another exemplary arrangement, a non-restricted valve includes 0.23" diameter (0.041 in$^2$ cross-sectional area) inlet and outlet passages that together contribute a Cv of about 0.6, and a valve seat and diaphragm having a 0.33" flow annulus diameter and a 0.02" fully open seat flow gap that provide a seat annulus flow area (i.e., annular area between valve seat and stem tip in fully open valve position) of about 0.021 in$^2$ and a Cv of about 0.7, to provide a valve having a Cv of about 0.6. In such an arrangement, providing the inlet passage with a 0.1" diameter (0.008 in$^2$ cross-sectional area) reduced orifice provides a 0.25 Cv flow restriction and an effective Cv of about 0.23 for the valve.

Although the invention has been disclosed and described with respect to certain exemplary embodiments, certain variations and modifications may occur to those skilled in the art upon reading this specification. Any such variations and modifications are within the purview of the invention notwithstanding the defining limitations of the accompanying claims and equivalents thereof. Accordingly, departures may be made from such details without departing from the spirit or scope of the applicant's general inventive concept.

I claim:

1. An actuated valve assembly comprising:
   a valve body including a valve seat disposed between inlet and outlet passages, and a fixed orifice restriction provided in at least one of the inlet and outlet passages;
   a valve element assembled with the valve body and axially movable between a closed position in sealing engagement with the valve seat, to block flow between the inlet and outlet passages, and an open position spaced apart from the valve seat to permit flow between the inlet and outlet passages;
   an actuator assembled with the valve body and connected with the valve element for axial movement of the valve element between the closed and open positions; and
   a stroke adjustment mechanism operable to adjust the open position from a maximum open position to a reduced open position to limit the movement of the valve element to adjust a seat annulus flow area associated with the valve seat and valve element from a maximum seat annulus flow area in the maximum open position to a reduced seat annulus flow area in the reduced open position;
   wherein the actuated valve assembly has an effective flow coefficient based on a first flow coefficient of the fixed orifice restriction and a second flow coefficient of a remainder of the actuated valve assembly without the fixed orifice restriction;
   wherein a ratio of the second flow coefficient to the first flow coefficient is between 3:2 and 4:1 when the valve element is in the maximum open position, corresponding to a maximum effective flow coefficient; and
   wherein the fixed orifice restriction is sized such that operation of the stroke adjustment mechanism to reduce the second flow coefficient by one half provides at least an 8% reduction in the effective flow coefficient from the maximum effective flow coefficient.

2. The actuated valve assembly of claim 1, wherein the actuator comprises a pneumatic actuator spring biased to the closed position with an actuator port that receives pressurized gas for pressurized movement of a piston within an actuator housing and against a biasing spring for movement of the valve element to the open position.

3. The actuated valve assembly of claim 1, wherein the valve element includes an axially movable stem having a stem tip assembled with an end portion of the stem, with the stem tip including an annular seal for sealing engagement with the valve seat in the closed position.

4. The actuated valve assembly of claim 1, wherein the fixed orifice restriction is integrally formed with the valve body.

5. The actuated valve assembly of claim 1, wherein the fixed orifice restriction is defined by the inlet passage.

6. The actuated valve assembly of claim 1, wherein the stroke adjustment mechanism includes an apertured set screw installed in an actuator port of the actuator, the apertured set screw being threadably adjustable to a range of axial positions to define a stop position for an actuator piston to limit the open position of the valve element.

7. The actuated valve assembly of claim 1, wherein the valve assembly exhibits an effective flow coefficient tolerance based on a valve flow coefficient tolerance attributed to the valve seat and valve element, and an orifice flow coefficient tolerance attributed to the fixed orifice restriction, wherein the stroke adjustment mechanism is configured to eliminate the effective flow coefficient tolerance by adjusting the open position to a partially open valve flow coefficient within an upper half of a valve flow coefficient range.

8. The actuated valve assembly of claim 1, wherein the fixed orifice restriction is axially spaced apart from the valve seat.

9. The actuated valve assembly of claim 8, wherein the fixed orifice restriction is continuous with the inlet passage.

10. A method of setting a predetermined flow coefficient for an actuated valve assembly, the method comprising:

providing an actuated valve assembly comprising:

a valve body including a valve seat disposed between inlet and outlet passages, and a fixed orifice restriction provided in at least one of the inlet and outlet passages;

a valve element assembled with the valve body and axially movable between a closed position in sealing engagement with the valve seat, to block flow between the inlet and outlet passages, and an open position spaced apart from the valve seat to permit flow between the inlet and outlet passages; and an actuator assembled with the valve body and connected with the valve element for axial movement of the valve element between the closed and open positions;

a stroke adjustment mechanism operable to adjust the open position from a maximum open position to a reduced open position to limit the movement of the valve element to adjust a seat annulus flow area associated with the valve seat and valve element from a maximum seat annulus flow area in the maximum open position to a reduced seat annulus flow area in the reduced open position;

wherein the actuated valve assembly has an effective flow coefficient based on a first flow coefficient of the fixed orifice restriction and a second flow coefficient of a remainder of the actuated valve assembly without the fixed orifice restriction;

wherein a ratio of the second flow coefficient to the first flow coefficient is between 3:2 and 4:1 when the valve element is in the maximum open position, corresponding to a maximum effective flow coefficient; and wherein the fixed orifice restriction is sized such that operation of the stroke adjustment mechanism to reduce the second flow coefficient by one half provides at least an 8% reduction in the effective flow coefficient from the maximum effective flow coefficient; and adjusting the stroke adjustment mechanism to adjust the effective flow coefficient to correspond with the predetermined flow coefficient.

11. The method of claim 10, wherein the actuator comprises a pneumatic actuator spring biased to the closed position with an actuator port that receives pressurized gas for pressurized movement of a piston within an actuator housing and against a biasing spring for movement of the valve element to the open position.

12. The method of claim 10, wherein the valve element includes an axially movable stem having a stem tip assembled with an end portion of the stem, with the stem tip including an annular seal for sealing engagement with the valve seat in the closed position.

13. The method of claim 10, wherein the fixed orifice restriction is integrally formed with the valve body.

14. The method of claim 10, wherein the fixed orifice restriction is defined by the inlet passage.

15. The method of claim 10, wherein the fixed orifice restriction is axially spaced apart from the valve seat.

16. The method of claim 15, wherein the fixed orifice restriction is continuous with the inlet passage.

17. The method of claim 10, wherein the stroke adjustment mechanism includes an apertured set screw installed in an actuator port of the actuator, the apertured set screw being threadably adjustable to a range of axial positions to define a stop position for an actuator piston to limit the open position of the valve element.

18. The method of claim 10, wherein the valve assembly exhibits an effective flow coefficient tolerance based on a valve flow coefficient tolerance attributed to the valve seat and valve element, and an orifice flow coefficient tolerance attributed to the fixed orifice restriction, wherein the stroke adjustment mechanism is configured to eliminate the effective flow coefficient tolerance by adjusting the open position to a partially open valve flow coefficient within an upper half of a valve flow coefficient range.

19. An actuated valve assembly comprising:

a valve body including a valve seat disposed between inlet and outlet passages, and a fixed orifice restriction provided in at least one of the inlet and outlet passages;

a valve element assembled with the valve body and axially movable between a closed position in sealing engagement with the valve seat, to block flow between the inlet and outlet passages, and an open position spaced apart from the valve seat to permit flow between the inlet and outlet passages;

an actuator assembled with the valve body and connected with the valve element for axial movement of the valve element between the closed and open positions;

wherein a ratio of a maximum seat annulus flow coefficient associated with the valve seat and valve element to an orifice flow coefficient associated with the fixed orifice restriction is between 2:1 and 8:1; and wherein the fixed orifice restriction is integrally formed with the valve body.

20. The actuated valve assembly of claim 19, wherein the fixed orifice restriction is axially spaced apart from the valve seat.

* * * * *